United States Patent Office 3,269,781
Patented August 30, 1966

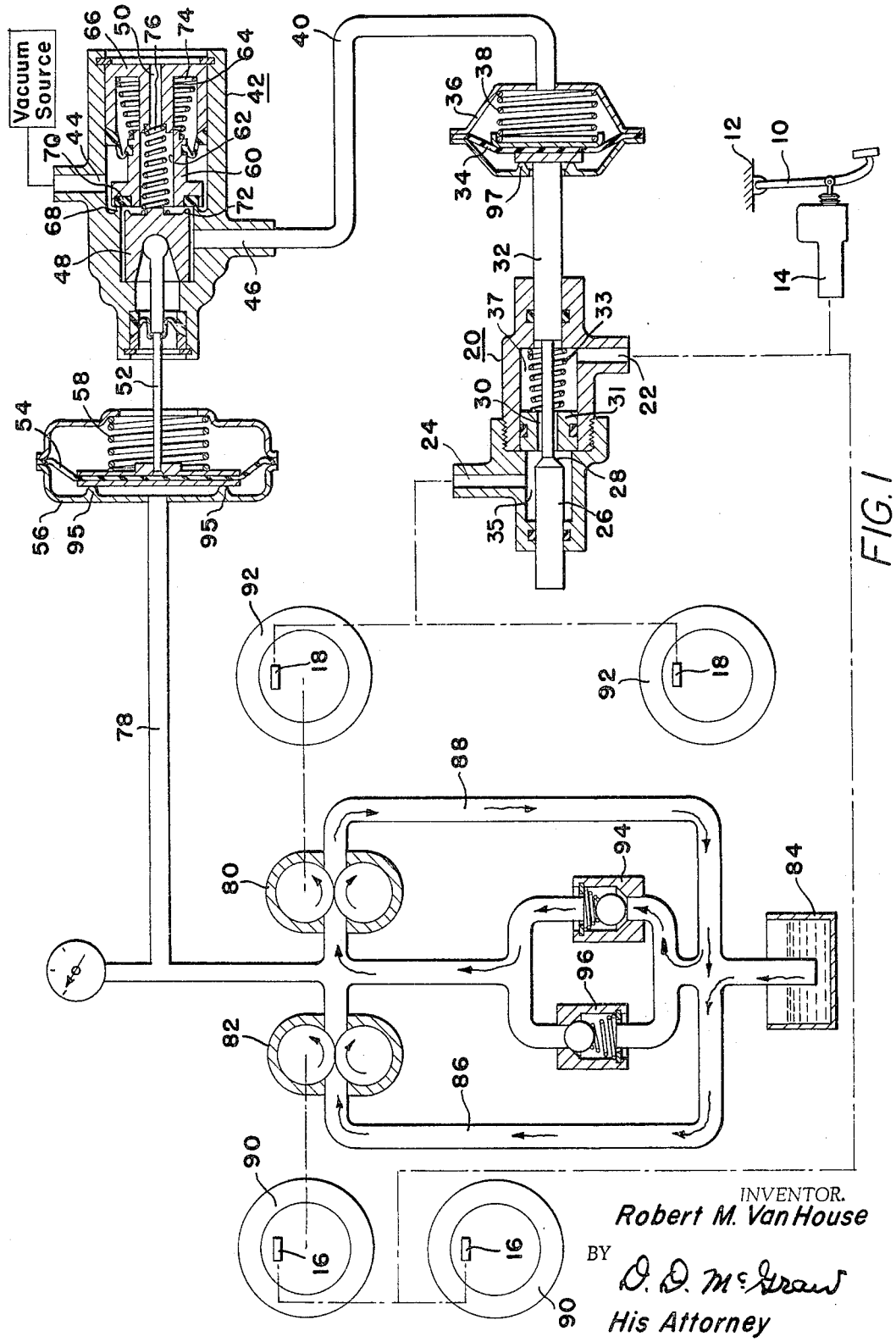

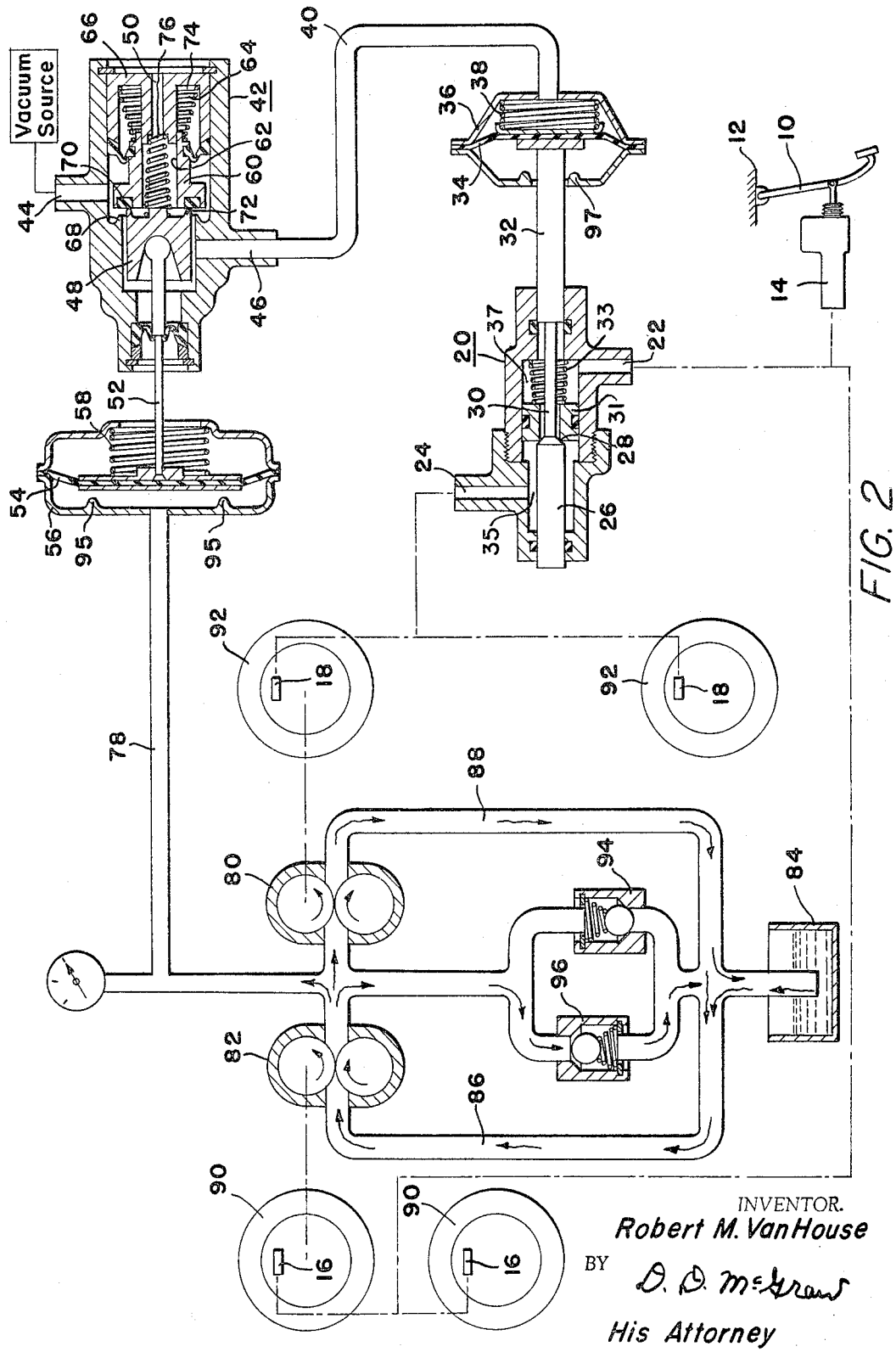

3,269,781
BRAKE ANTI-SKID DEVICE
Robert M. Van House, Dayton, Ohio, assignor to General Motors Corporation, Detroit, Mich., a corporation of Delaware
Filed Aug. 24, 1964, Ser. No. 391,606
2 Claims. (Cl. 303—6)

This invention relates to hydraulic control systems and more particularly to mechanisms which prevent wheels of a vehicle from becoming locked during braking and causing a vehicle to skid. Reference is made to copending application 392,866 of Flory et al., filed August 28, 1964 which describes a similar invention.

When a vehicle is braked to impede motion in the forward direction, a weight shift occurs and the front wheels of the vehicle have more of the vehicle effective weight on them than the rear wheels. When hydraulic brakes are applied, an equal pressure is felt at both the rear wheels and the front wheels. In view of the fact that there is more effective weight on the front wheels than the rear wheels, the weight causes a greater resistance to braking on the front wheels than the rear wheels. The rear wheels, under these circumstances, will tend to become locked sooner than the front wheels and a skid of the vehicle may result. This invention obviates this problem.

It is an object of the present invention to provide an improved vehicle anti-skid device which shuts off hydraulic pressure to a wheel when it has a tendency to become locked during braking.

It is another object of the present invention to provide an improved vehicle anti-skid device which utilizes a reference pump driven at a proportional speed to the front wheels of the vehicle and a control pump driven at a proportional speed to the rear wheels of the vehicle which combine to actuate mechanism to shut off and decrease hydraulic pressure to a wheel having a tendency to skid during braking.

It is still another object of the present invention to provide an improved vehicle anti-skid device which utilizes a negative pressure selectively routed from the engine intake manifold to a control valve to shut off and decrease hydraulic pressure to a vehicle wheel having a tendency to rotate at a disproportionate rate relative to another wheel while at the same time increasing the pressure supplied to the other wheel or wheels.

It is yet another object of the present invention to provide an improved vehicle anti-skid device which uses a controlled hydraulic pressure to actuate a three-way valve between a vacuum source and vacuum operable means to shut off and reduce hydraulic pressure to a vehicle brake when the wheel carrying the brake tends to skid during brake application.

It is a further object of the present invention to provide an improved vehicle anti-skid device which uses a plurality of hydraulic pumps in a closed hydraulic system to provide an output pressure when one of the plurality of pumps decreases its output relative to another one of the pumps.

Further objects and advantages of the present invention will be apparent from the following description, reference being had to the accompanying drawings wherein a preferred embodiment of the present invention is clearly shown.

In the drawings:

FIGURE 1 is a diagrammatic illustration of the invention with certain parts shown in section and the mechanism illustrated in a configuration it would assume during periods when the wheels of a vehicle are rotating at substantially the same speed;

FIGURE 2 is a diagrammatic illustration of the invention with certain parts shown in section and the mechanism illustrated in a configuration it would assume during periods when the wheels of the vehicle are not rotating at the same speed.

Referring now to FIGURE 1, a brake pedal 10 pivotally supported from a fixed portion 12 of a vehicle is arranged to displace fluid from a master cylinder 14 to a series of wheel cylinders 16 and 18 to energize the vehicle brakes in a conventional manner. It will be assumed that the wheel cylinders 16 actuate brakes on the front wheels of the vehicle and the wheel cylinders 18 actuate brakes on the rear wheels of the vehicle.

A brake fluid modulator 20 is substantially a control valve and is referred to herein as the first valve means. The valve 20 has an inlet 22 from the master cylinder 14 and an outlet 24 to the rear wheel cylinders 18. A piston means 26 has a tapered portion 28 adapted to seal against one end of an aperture 30 in a sleeve 31 disposed between two compartments 35 and 37 of the valve body and biased into the position shown in FIGURE 1 by a spring 33. It is seen that the fluid communication between the inlet 22 and the outlet 24 is interruptible by the tapered portion 28 of the piston means 26 sealing off the aperture 30 in sleeve 31. The piston means 26 is connected through a drive rod 32 to one face of a diaphragm 34 carried for translational movement within a vacuum actuator 36. A spring 38 bearing against an opposite side of the diaphragm from the drive rod 32 serves to bias the diaphragm leftwardly as viewed in FIGURE 1. In this configuration, the piston means 26 is kept out of engagement with the aperture 30 and there is free fluid communication between the master cylinder 14 and the outlet 24.

A vacuum line 40 connects one side of the diaphragm 34 with a vacuum control valve 42 herein referred to as the second valve means. The vacuum control valve 42 has an inlet 44 from a vacuum source and an outlet 46 into the vacuum line 40. A piston 48 slidable translationally within the control valve 42 is adapted to selectively route vacuum from the inlet 44 to the outlet 46 or atmospheric pressure from an atmospheric inlet 50 to the outlet 46. It is thereby seen that, if vacuum pressure is present at the outlet 46, the diaphragm 34 of the first valve means tends to be drawn away from its seat against the force of the spring 38, thereby drawing the tapered portion 28 of piston means 26 into engagement with the edge of the aperture 30 in sleeve 31. When atmospheric pressure is present at the outlet 46, there is no pressure differential except the force of the spring 38 against the diaphragm 34 and the brake fluid modulator 20 allows free fluid communication between the inlet 22 and the outlet 24 of the valve 20.

The vacuum control valve piston 48 is engaged by an actuator rod 52 that is operatively carried by a diaphragm 54 disposed in the actuator body 56. A spring 58 biases the diaphragm 54 in one extreme of movement in the actuator body 56 and, while in this position, no rightward force from the rod 52 is exerted on the piston 48.

A piston means 60 in valve 42 includes a bore 62 which is slidable on an outer periphery 64 of another piston 66. The vacuum control valve 42, as previously stated, functions as a three-way valve in that it selectively routes vacuum or atmospheric pressure to the outlet 46. A valve seat 68 formed on the housing of valve 42 normally engages a seal 70 carried by the piston 60. A portion 72 of the piston 48 is engageable with the seal 70 to drive it off the seat 68 in response to movement of the rod 52 carried by the diaphragm 54. During periods of time when the piston 48 is not forcefully engaged by the rod 52, atmosphere from the inlet 50 communicates freely through the piston 66 and through the center of the piston 60 past the portion 72 of the piston 48 to outlet 46. It is noted that clearance exists between the portion 72 and the seal 70 when the seal 70 is positioned against the valve seat 68. A spring 74 urges the piston 60 against the seat 68 and a spring 76, positioned between the piston 66 and the piston 48, urges the piston 48 away from the seal 70.

The diaphragm 54 is responsive to pressure created in a line 78, connected to one chamber of actuator body 56, by the cooperation of fluid pumps 80 and 82. Fluid pump 82 is disposed in a closed hydraulic system that draws fluid from a sump 84 through lines 86 or 88. The pump 82 is driven at a speed proportional to the rotation of a series of wheels 90 which would be, for example, the front wheels of the vehicle. The front wheels 90 and the rear wheels 92, illustrated schematically in the drawings, include friction surfaces, such as rotatable disks or drums, with which brake shoe elements are frictionally engaged when the brakes are energized. The front wheels of the vehicle are the wheels which, during braking, would have the majority of the vehicle effective weight disposed thereon. The pump 80, also referred to as the control pump, is driven at a speed proportional to the speed of the rear wheels 92 and, during conditions of operation when the front wheels and rear wheels are rotating in unison, has an output greater than the pump 82. During the periods when the wheels are rotating in unison, the pump 80 is dominant and will cause a zero pressure to exist in the line 78 because the output of reference pump 82 is not sufficient to provide enough fluid at the input side of pump 80. Under these conditions of operation, the fluid flow will be in the direction of the arrows shown in FIGURE 1.

Check valve 94 will become unseated during a condition when a fluid supply in excess of that in the system is needed by pump 80. The fluid will come from the sump 84 as shown by the direction of the arrows in FIGURE 1. Check valve 96 will become unseated when pump 82 is dominant and pumps more fluid than pump 80 can process at a greater pressure than is required to move the diaphragm 54 against the spring 58 sufficiently to operate the valve 42. This prevents an overtravel in the valve 42 and eliminates the possibility of damage to the operating parts of the valve 42. Fluid flow in the system under these conditions is illustrated by the arrows in FIGURE 2.

In operation, the diagrammatic view of the invention illustrated in FIGURE 1 depicts the configuration of parts and the direction of fluid flow during periods of time when the front wheels 90 of the vehicle are rotating in unison or substantially in unison with the rear wheels 92 of the vehicle. It is understood that a differential in rotation between the front wheels and the rear wheels is tolerable except when the differential is so great that skidding of the rear wheels is likely to occur. This is determined by the design of the various springs and designed pump outputs for a given installation. It is noted that there is no pressure in the line 78 and, therefore, the diaphragm 54 is in a poised position and maintained therein by the force of the spring 58. During this time, the pump 80 is providing a greater output than the pump 82.

Referring now to FIGURE 2, the control pump that is rotating at a speed proportional to the rear wheels of the vehicle has slowed down to a point where the reference pump 82 is pumping more fluid than the pump 80. This has occurred because of an incipient rear wheel skid condition where the rear wheels are rotating at a slower speed than the front wheels. Under these conditions of operation, the line 78 becomes pressurized and the diaphragm 54 is moved towards the right as viewed in FIGURE 2. As the diaphragm 54 moves, it carries the rod 52 into driving engagement with the piston 48. As previously described, the portion 72 of the piston 48 is not in engagement with the seal 70 while the piston 48 is in the poised position and atmospheric pressure flows freely from the atmosphere through the outlet 46 of the vacuum control valve 42. The initial movement of the piston 48 seals the line 40 from the atmosphere by engagement of piston portion 72 and seal 70. As the piston 48 is moved by the diaphragm 54 further toward the right as viewed in FIGURE 2, the seal 70 is pushed from its seat 68 and the outlet 46 is brought into fluid communication with the inlet 44 from the vacuum source.

The line 40 becomes negatively pressurized and the diaphragm 34 in the vacuum actuator 36 is drawn from its seat against the force of spring 38, thereby drawing the drive rod 32 in the direction of diaphragm movement. This movement of the drive rod 32 draws the piston means 26 toward the aperture 30 and finally results in the tapered portion 28 sealing off the aperture 30. As previously described, when the tapered portion 28 seals off the aperture 30, a path for fluid communication between the inlet 22 and the outlet 24 of the brake fluid modulator 20 is shut off. Therefore, pressure from the master cylinder 14 is not communicated to the rear wheels that have slowed down more than the front wheels, and all of the pressure from the master cylinder 14 is communicated to the front wheels. Since the pressure in outlet 24 and the rear wheel brake lines is equal to that at inlet 22 at the moment piston 26 becomes seated in aperture 30 of sleeve 31, means must be provided to relieve the pressure applied to the rear wheel braking system in order to allow the wheels to again rotate at a speed approaching that of the front wheels. In the present invention fluid modulator 20 has been designed to have the effect of balancing the braking forces applied to the front and rear wheels in proportion to the respective loading thereof by cutting off and decreasing the pressure applied to the rear wheel brake lines while at the same time increasing the pressure applied to the front wheel brake lines. As vacuum control valve 42 is opened in response to a speed differential between the front and rear wheels of the vehicle a negative pressure is suplied to diaphragm 34 of actuator 36 so as to cause piston 26 to move rightwardly as viewed in FIGURE 2. Upon becoming seated in aperture 30 of sleeve 31 thereby cutting off the fluid communication between the master cylinder and the rear wheels of the vehicle the piston 26 continues to move rightwardly drawing with it sleeve 31. As the sleeve 31 is moved rightwardly the volume of chamber 35 is increased and as a result thereof the fluid pressure in the rear wheel braking system is reduced allowing the rear wheels to again tend to rotate in proportion to the speed of the vehicle. Correspondingly, the volume in chamber 37 is decreased and the resulting increase in fluid pressure therein is transmitted to the front wheel braking system so as to apply an additional braking force thereto in proportion to the reduction in braking force applied to the rear wheels. It is then apparent that the braking forces applied to the respective front and rear sets of wheels have been effectively balanced to correspond with the shift in wheel loading caused by the braking action. The rear wheels, having the tendency to skid due to the unequal weight distribution previously described, will continue to rotate at a reduced rate and the control pump, driven at a speed proportional to the rear wheels, will stabilize at a reduced output. When the reference pump 82, driven by the front wheels 90, is slowed to a point where its output is less than that of the control pump, the cycle will be reversed and the line 78 to the actuator body 56 will be depressurized. Thereafter, the system will function in the same manner as described in FIGURE 1.

When the control pump 80 has an output that exceeds the output of the reference pump 82, the diaphragm 54 of the actuator body 56 will return to a poised position against the stops 95, at the same time drawing the rod 52 toward the left as viewed in FIGURE 2. The spring 76 will drive the piston 48 in the direction of the rod 54 as it returns and the spring 74 will drive the piston 60 and the seal 70 toward the valve seat 68. The piston 60 will seat against the valve seat 68, shutting off the vacuum from the inlet 44. The piston 48 will continue to move until the portion 72 of the piston 48 is clear of the seal 70. At this time, the vacuum line 40 is returned to fluid communication with the atmosphere through the inlet 50 and the spring 38 will drive the diaphragm 34 against a seat 97. The movement of the diaphragm 34 will drive the rod 32 and the piston means 26 away from the vacuum actuator 36. The tapered portion 28 of the piston means 26 will thereby be positioned out of engagement with the aperture 30 and free fluid communication reestablished between the inlet 22 and outlet 24 of the brake fluid modulator 20. Pressure will again be communicated from the master cylinder 14 to the wheel cylinders 18 in the rear wheels 92 and further stopping force exerted thereon. The sensitivity of the system can be controlled so that the brake fluid modulator or first valve means 20 modulates the pressure to the rear wheels or merely prevents pressure from reaching the rear wheel brakes after a predetermined amount of braking force is exerted thereon.

When the brakes are released by the releasing of the pedal 10, the rear wheels 92 will again approximate the rotational speed of the front wheels 90 and the same cycle described previously will occur. That is, the control pump speed will again approximate the reference pump speed and, due to the greater output of the control pump, will leave the line 78 unpressurized.

The subject invention finds particular utility in an application where it is desirable to prevent equal pressure distribution to various parts of an hydraulic system under certain operating conditions although the normal pressure distribution in such a system is equal. The reference in this description to the front wheels and rear wheels of a vehicle is not meant to limit the subject invention to this environment. In an automobile, this type of usage is appropriate. However, it is understood that the system might be used in an application where it is desirable to prevent the skidding of multiple wheels such as a truck braking system. In such an environment, the weight distribution during braking might be different than on an automobile and the wheels on which the brake action is decreased would not necessarily be referred to as front and rear wheels.

It is likewise understood that the vacuum source referred to herein as being the intake manifold of an engine could be a vacuum pump driven by the engine, for example. It is further understood that a positive fluid pressure source could be used in lieu of a vacuum source requiring only skill in the art to make the necessary changes in order to accommodate this different type of pressure source.

While the embodiment of the present invention, as herein disclosed, constitutes a preferred form, it is to be understood that other forms might be adopted.

What is claimed is as follows:

1. A brake control system for a vehicle having front wheels and rear wheels and hydraulic pressure actuated brakes for said wheels and means for generating hydraulic pressure and first hydraulic conduit means connecting said front wheel brakes with said pressure generating means and second hydraulic conduit means connecting said rear wheel brakes with said pressure generating means, said system comprising: a first fluid pressure pump driven by said front wheels and having an intake and an output; a second fluid pressure pump driven by said rear wheels and having an intake and an output; a fluid reservoir; first conduit means fluid interconnecting said first pump intake with said reservoir and said second pump output; second conduit means fluid interconecting said first pump output and said second pump intake; third conduit means having two parallel flow branches interconnected at the ends thereof to form a directional flow control pressure loop therein and fluid interconnecting said first and second conduit means; a normally closed, fluid pressure opened, check valve in each of said flow branches acting to permit and prevent fluid flow under pressure in opposite directions; fourth conduit means fluid connected with said second conduit means; hydraulic pressure control valve means in the second hydraulic conduit means intermediate the rear wheel brakes and the pressure generating means for cutting off and reducing the hydraulic pressure applied to the rear wheel brakes and simultaneously applying an additional hydraulic pressure to the front wheel brakes, said additional hydraulic pressure being proportional to the reduction in hydraulic pressure in the rear wheel brakes, and fluid pressure sensitive control means responsive to fluid pressure in said fourth conduit means and operatively connected to said hydraulic control valve means to regulate the hydraulic pressure applied respectively to the front and rear wheels in proportion to a shift in wheel loading as indicated by a predetermined fluid pressure generated in said fourth conduit means by the relative pumping action of said pumps.

2. A vehicle brake control system for a vehicle having front and rear wheels and brakes therefor, said system comprising: a fluid circuit having first fluid pumping means driven by the front wheels, second fluid pumping means driven by the rear wheels with the fluid intake thereof fluid connected to the fluid output of said first fluid pumping means, said pumping means having a predetermined fluid pumping ratio when the front and rear wheels are rotating at comparable speeds; means sensing changes in said fluid pumping ratio caused by a decrease in rotating speed of the rear wheels relative to the rotating speed of the front wheels; and means controlled by said sensing means to cut off and decrease the braking force applied to said rear wheels while simultaneously increasing the braking force applied to the front wheels when the fluid pumping ratio between said first and second pumps differs from a predetermined fluid pumping ratio by a predetermined amount.

References Cited by the Examiner

UNITED STATES PATENTS

| | | | |
|---|---|---|---|
| 2,132,916 | 10/1938 | Aikman | 188—181 X |
| 3,093,422 | 6/1963 | Packer et al. | 303—21 |
| 3,184,269 | 5/1965 | Hager | 303—6 |

FOREIGN PATENTS

| | | |
|---|---|---|
| 706,298 | 5/1963 | Canada. |

EUGENE G. BOTZ, *Primary Examiner.*